US012602622B2

(12) United States Patent
    Vaz Guimarães Pinto De Melo

(10) Patent No.: US 12,602,622 B2
(45) Date of Patent: Apr. 14, 2026

(54) METHOD AND DEVICE FOR TRAINING AND PREDICTING A CONJUNCTION PARAMETER FROM CONJUNCTION DATA MESSAGES

(71) Applicant: NEURASPACE, S.A., Coimbra (PT)

(72) Inventor: Marta Isabel Vaz Guimarães Pinto De Melo, Lisbon (PT)

(73) Assignee: NEURASPACE, S.A., Coimbra (PT)

( * ) Notice: Subject to any disclaimer, the term of this patent is extended or adjusted under 35 U.S.C. 154(b) by 0 days.

(21) Appl. No.: 19/027,530

(22) Filed: Jan. 17, 2025

(65) Prior Publication Data

US 2025/0238729 A1    Jul. 24, 2025

(30) Foreign Application Priority Data

Jan. 19, 2024  (PT) ......................................... 119220
Mar. 25, 2024  (EP) ..................................... 24165990

(51) Int. Cl.
    *G06N 20/00*        (2019.01)

(52) U.S. Cl.
    CPC ................................... *G06N 20/00* (2019.01)

(58) Field of Classification Search
    None
    See application file for complete search history.

(56) References Cited

U.S. PATENT DOCUMENTS

2023/0084262 A1*  3/2023  Smythe ................. B64G 1/242
                                                      701/13
2025/0256864 A1*  8/2025  Catledge .......... G06Q 10/06312

OTHER PUBLICATIONS

Hernández, Cristina Pérez. "Should I stay or should I go? Machine Learning applied to Conjunction Analysis Cristina Pérez Hernández, Daniel Lubián-Arenillasb, Carlos Paulete Periañezc, Jesús Tirado Velezd Alexandru Solomone." (2022). (Year: 2022).*
Stevenson, Emma, et al. "Self-supervised machine learning based approach to orbit modelling applied to space traffic management." arXiv preprint arXiv:2312.06854 (2023). (Year: 2023).*
Syam, Wahyudin P., et al. "Transformer deep learning for accurate orbit corrections in real-time." Proceedings of the 36th International Technical Meeting of the Satellite Division of The Institute of Navigation (ION GNSS+ 2023). 2023. (Year: 2023).*
Vaswani, Ashish, et al. "Attention is all you need." Advances in neural information processing systems 30 (2017). (Year: 2017).*
Bahdanau, Dzmitry et al., "Neural Machine Translation by Jointly Learning to Align and Translate", International Conference on Learning Representations (ICLR), arXiv preprint arXiv:1409.0473, 2014 (15 pages).

(Continued)

*Primary Examiner* — Daniel T Pellett
(74) *Attorney, Agent, or Firm* — Leason Ellis LLP

(57) ABSTRACT

The present document discloses a computer-implemented method for predicting a conjunction parameter from conjunction data messages and the respective method for training a transformer-based machine-learning model for predicting a conjunction parameter. It is also disclosed a device comprising a computer-readable medium comprising the trained transformer-based machine-learning model and a computer configured to carry out the training method of the transformer-based machine-learning model.

17 Claims, 9 Drawing Sheets

(56) References Cited

OTHER PUBLICATIONS

Bastida Virgili, Benjamin et al., "CREAM: ESA's Proposal for Collision Risk Estimation and Automated Mitigation", 1st International Orbital Debris Conference, 2019 (9 pages).

Bishop, Christopher M., "Pattern Recognition and Machine Learning (Information Science and Statistics)", Springer-Verlag, Berlin, Heidelberg, 2006 (758 pages).

Devlin, Jacob, et al., "BERT: Pre-training of deep bidirectional transformers for language understanding", arXiv preprint arXiv:1810. 04805. 2018 (16 pages).

ESA Space Debris Office. ESA's Annual Space Environment Report. Jul. 2024, pp. 1-121.

Gal, Yarin, et al., "Dropout as a bayesian approximation: Representing model uncertainty in deep learning", International Conference on Machine Learning, 2016 (12 pages).

Hochreiter, Sepp, et al., "Long short-term memory", Neural Comput., 9 (8), Nov. 1997, pp. 1735-1780.

Kessler, Donald J., et al., "Collision Frequency of Artificial Satellites: The creation of a Debris Belt", Journal of Geophysical Research: Space Physics, 83: Jun. 1978, pp. 2637-2646.

LeCun, Yann, et al., "Deep learning", nature, 521(7553): May 2015, pp. 436-444.

Lim, Bryan, et al., "Temporal fusion transformers for interpretable multi-horizon time series forecasting", International Journal of Forecasting, 37(4), 2021, pp. 1748-1764.

Luong, Minh-Thang, et al., "Effective approaches to attention-based neural machine translation", arXiv preprint arXiv:1508.04025. 2015 (11 pages).

Metz, S., et al., "Implementation and Comparison of Databased Methods for Collision Avoidance in Satellite Operations", Proc. 8th European Conference on Space Debris (virtual), Darmstadt, Germany, Apr. 2021, publsihed by the ESA Space Debris Office May 2021 (8 pages).

Mikolov, Tomas, et al., "Efficient Estimation of Word Representations in Vector Space", arXiv preprint arXiv:1301.3781. 2013, pp. 1-12.

Pinto, Francesco, et al., "Towards Automated Satellite Conjunction Management with Bayesian Deep Learning", AI for Earth Sciences Workshop at NeurIPS, 2020 (7 pages).

Radford, Alec, et al. "Improving language understanding by generative pre-training", Computer Science, Linguistics, 2018, pp. 1-12.

Stroe, I.F., "AUTOCA: Autonomous Collision Avoidance System", 8th European Conference on Space Debris, Apr. 2021, published by the ESA Space Debris Office May 2021(12 pages).

Vaswani, Ashish, et al., Attention is All you Need, 31st Conference on Neural Information Processing Systems, 2017 (11 pages).

Wen, Qingsong, et al., "Transformers in time series: A survey", International Joint Conference on Artificial Intelligence (IJCAI), 2023, pp. 6778-6786.

Zhou, Haoyi, et al., "Informer: Beyond Efficient Transformer for Long Sequence Time-Series Forecasting", In The Thirty-Fifth AAAI Conference on Artificial Intelligence, AAAI 2021, pp. 11106-11115.

Extended European search report for corresponding European Application No. 24165990.3 dated Sep. 19, 2024 (9 pages).

Metz, Sasha, "Master Thesis: Implementation and comparison of data-based methods for collision avoidance in satellite operations", Jul. 2020 (144 pages).

* cited by examiner 301                    302                    303

| Conjunction | | CDM | CDM | CDM | CDM | CDM | CDM | CDM | CDM | CDM |
|---|---|---|---|---|---|---|---|---|---|---|
| | | | | CDM | CDM | CDM | CDM | CDM | CDM | CDM |
| | | | CDM | CDM | CDM | CDM | CDM | CDM | CDM | CDM |
| CDM | CDM | CDM | CDM | CDM | CDM | CDM | CDM | CDM | CDM |
| | | | | CDM | CDM | CDM | CDM | CDM | CDM |

Time

| | | | 6.4 | 5.7 | 5.3 | 4.6 | 3.7 | 3.4 | 3.1 |
| | 5.6 | 4.2 | 4.0 | 3.8 | 3.1 | 2.5 | 2.3 | 0.5 | 0.3 |
| 6.8 | 5.4 | 4.9 | 4.5 | 3.9 | 3.2 | 2.6 | 2.2 | 2.1 | 0.9 |
| | | | | 4.3 | 3.2 | 1.4 | 1.1 | 0.9 | 0.5 |
| | | 3.3 | 3.1 | 2.8 | 2.4 | 1.9 | 1.5 | 0.7 | 0.4 |

FIG. 5

| | | | 6.4 | 5.7 | 5.3 | 4.6 | 3.7 | 3.4 | 3.1 |
| | 5.6 | 4.2 | 4.0 | 3.8 | 3.1 | 2.5 | 2.3 | 0.5 | 0.3 |
| 6.8 | 5.4 | 4.9 | 4.5 | 3.9 | 3.2 | 2.6 | 2.2 | 2.1 | 0.9 |
| | | | | 4.3 | 3.2 | 1.4 | 1.1 | 0.9 | 0.5 |
| | | 3.3 | 3.1 | 2.8 | 2.4 | 1.9 | 1.5 | 0.7 | 0.4 |

|      | 5.6 | 4.2 | 4.0 | 3.8 | 3.1 | 2.5 | 2.3 | 0.5 | 0.3 |
|------|-----|-----|-----|-----|-----|-----|-----|-----|-----|
| 6.8  | 5.4 | 4.9 | 4.5 | 3.9 | 3.2 | 2.6 | 2.2 | 2.1 | 0.9 |
|      |     |     |     | 4.3 | 3.2 | 1.4 | 1.1 | 0.9 | 0.5 |
|      |     | 3.3 | 3.1 | 2.8 | 2.4 | 1.9 | 1.5 | 0.7 | 0.4 |

|      | 5.6 | 4.2 | 4.0 | 3.8 | 3.1 | 2.5 | 2.3 | 0.5 | 0.3 |
|------|-----|-----|-----|-----|-----|-----|-----|-----|-----|
| 6.8  | 5.4 | 4.9 | 4.5 | 3.9 | 3.2 | 2.6 | 2.2 | 2.1 | 0.9 |
|      |     | 3.3 | 3.1 | 2.8 | 2.4 | 1.9 | 1.5 | 0.7 | 0.4 |

901

METHOD AND DEVICE FOR TRAINING AND PREDICTING A CONJUNCTION PARAMETER FROM CONJUNCTION DATA MESSAGES

CROSS-REFERENCE

This application claims the benefit of priority under 35 U.S.C. § 119(e) from Portugal Patent Application No. 119220, filed on Jan. 19, 2024 and European Patent Application No. 24165990.3, filed Mar. 25, 2024, which are hereby incorporated by reference as if set forth in their entirety herein.

TECHNICAL FIELD

The present disclosure relates to method for predicting conjunction-related variables, namely a position uncertainty at the time of closest approach, in particular using Transformer-Based Models for space situational awareness and collision risk assessment.

BACKGROUND

The rapid growth of objects in Earth's orbit and the associated risks of collisions pose significant challenges for collision avoidance and space traffic management, making the safety and sustainability of space operations a critical concern. The European Space Agency estimates that the number of objects larger than 1 centimetre in Earth's orbit is likely over one million [1], and collisions between these objects generate even more debris, triggering the phenomena known as Kessler syndrome [2]. To prevent such catastrophic failures, satellite owners/operators must have a comprehensive understanding of the collision risks their assets face.

To facilitate this monitoring process, the global Space Surveillance Network (SSN) plays a crucial role in detecting, tracking, identifying, cataloguing, and predicting the future states of space objects. The Space Surveillance Network's simulator propagates the evolution of these objects' states over time to assess the likelihood of collisions. Each satellite, referred to as the target, undergoes potential close screening against all catalogued objects to identify potential close approaches, also known as conjunctions. Upon detection of a conjunction between the target and another object, often referred to as the chaser, the Space Surveillance Network issues a conjunction data message (CDM). These CDMs provide essential information about the event, including the anticipated time of closest approach and the probability of a collision. As the time of closest approach approaches, additional CDMs are generated, serving as timely warnings for satellite owners/operators to assess the risks and determine the need for potential satellite maneuvering.

With the escalating number of space objects and the complexity of their interactions, innovative approaches for managing collision risks have become imperative. Ensuring safe and effective space activities requires satellite owners/operators to rely on constantly updated estimates of encounters, including the uncertainty associated with the position of each object at the expected time of closest approach. Accurate estimation of the time of closest approach is crucial for planning risk mitigation measures, such as collision avoidance manoeuvres. However, obtaining precise time of closest approach estimates often happens close to the critical decision moment, where safe avoidance manoeuvres may not be feasible or incur significant costs.

Given these challenges, the ability to forecast the evolution of position uncertainty in advance becomes paramount for satellite operators. Having insights into the evolution of this crucial variable enables operators to proactively prepare and strategize to minimise the risks associated with close encounters.

Due to the rapidly increasing number of resident space objects, there has been a growing interest in studying and forecasting the evolution of the object's position uncertainty [4]. More concretely, the prediction target usually considered are the main diagonal elements of the chaser covariance matrix, i.e., the position uncertainty/variance on the major axis (FIG. 1). Such a decision relies on the fact that the main eigenvectors of the covariance matrix are typically almost aligned with the satellite motion.

FIG. 1 shows a graphical representation of a satellite position uncertainty. In this example, the uncertainty ellipsoid is aligned with the satellite motion, i.e., with the satellite reference frame (101, 102, 103).

Metz [5] was one of the first researchers who explored the use of machine learning to predict the position uncertainty at the time of closest approach. It was investigated the use of different strategies, namely, decision tree methods and neural networks, such as multilayer perceptron [6] and long short-term memory (LSTM) [7] networks. Building upon this research, Stroe et al. [8] also leveraged LSTMs but innovatively combined them with the attention mechanism [9, 10]. Moreover, they investigated predicting at different time horizons, introducing new dimensions to the problem.

The problem of quantifying uncertainty associated with the predictions generated by machine learning models is crucial for their practical applications. Deep learning approaches, although powerful, often lack interpretability, making it challenging for operators to trust the outputs of neural networks. To address this concern, Pinto et al. [11] proposed a Bayesian deep learning approach by leveraging the Monte Carlo dropout technique applied to a stack of LSTMs. Such an approach provides probability distributions for predictions, enabling robust uncertainty quantification. This allows satellite operators to make more informed decisions, considering the level of uncertainty associated with the model's predictions.

The Transformer model architecture (FIG. 2) introduced by Vaswani et al. [3], revolutionised the field of natural language processing and has since become the cornerstone for various other sequence-to-sequence tasks in machine learning. The Transformer architecture was developed to address the limitations of traditional recurrent neural networks (such as LSTMs) [7] and convolutional neural networks [12] in capturing long-range dependencies in sequential data, particularly in the context of language understanding and generation tasks.

FIG. 2 shows a graphical representation of an embodiment of a Transformer model architecture.

Wen et al. [13] summarise the recent advances of Transformers for modelling time series data. Some works represent important advancements in the field containing useful information for the proposed solution. Zhou et al. [14] proposed to encode timestamps as additional positional encoding by using learnable embedding layers, and explored the low-rank property of the self-attention matrix to speed up the computation. Lim et al. [15] designed a multi-horizon forecasting model with static covariate encoders, gating feature selection, and temporal self-attention decoder. It encodes and selects useful information from various covariates to perform forecasting.

However, none of these works is suitable to process short-time series.

Time series data, which represents a sequence of observations ordered by time, often exhibits complex temporal dependencies, seasonal patterns, and long-range interactions. Traditional forecasting methods like autoregressive models and recurrent neural networks struggled to effectively capture such complex relationships, leading to suboptimal performance in handling large-scale, high-dimensional time series data.

Forecasting the position uncertainty of space objects presents several challenges. Some of the major drawbacks stem from the complex nature of the data and how such data is provided in real-life operations.

In summary, the risk of collision between resident space objects has significantly increased in recent years. As a result, spacecraft collision avoidance procedures have become an essential part of satellite operations. To ensure safe and effective space activities, satellite owners and operators rely on constantly updated estimates of encounters. These estimates include the uncertainty associated with the position of each object at the expected time of closest approach (TCA). These estimates are crucial in planning risk mitigation measures, such as collision avoidance manoeuvres. As the time of closest approach is approached, the accuracy of these estimates improves, as both objects' orbit determination and propagation procedures are made for increasingly shorter time intervals. However, this improvement comes at the cost of taking place close to the critical decision moment. This means that safe avoidance manoeuvres might not be possible or could incur significant costs. Therefore, knowing the evolution of this variable in advance can be crucial for operators.

These facts are disclosed in order to illustrate the technical problem addressed by the present disclosure.

GENERAL DESCRIPTION

The present document discloses a machine learning model based on Transformer models to forecast the position uncertainty of objects involved in a close encounter, particularly for the secondary object (usually debris), which tends to be more unpredictable. Transformer-based models are a class of state-of-the-art deep learning architectures. They capture multiscale effects by creating a succession of self-attention layers. Such an attention mechanism can effectively model dependencies between different positions in a sequence, and in this mode, the model develops robust predictions. Such properties are well-suited to predicting the position uncertainty of space objects at the time of closest approach.

A key aspect in the Transformer architecture, applicable to the present disclosure, is the use of the attention mechanism, which allows the model to weigh the importance of different positions in the input sequence when generating the output.

The present document discloses a computer-implemented method for training a transformer-based machine-learning model for predicting a conjunction parameter from conjunction data messages, CDM, wherein a conjunction is a pair of orbiting objects, the method comprising: receiving a dataset comprising a conjunction time series for each conjunction, wherein each said series is irregularly spaced and comprises a plurality of CDM records, each CDM record comprising a time to TCA, Time of Closest Approach, and a conjunction parameter, generating a CDM array comprising a plurality of cells, one cell for each CDM record, organized in rows, one row for each conjunction time series, and a plurality of columns, where each row is right-aligned such that a rightmost column of the CDM array comprises the most recent CDM record for each conjunction time series; generating a mask for the generated CDM array where each CDM record is masked if the TCA of said each CDM record is lower than a predetermined TCA threshold; training a transformer-based machine-learning model by using as training input the generated CDM array masked by said mask and using as training output the generated CDM array, wherein each said CDM record is a token for transformer-based machine-learning model.

In an embodiment, said method further comprising, before training, encoding each CDM record of the CDM array by: embedding the conjunction parameter into an embedded encoding; positionally encoding the time to TCA; combining the embedded encoding of the conjunction parameter with the positionally encoding of the time to TCA, in particular by summing the embedded encoding of the conjunction parameter with the positionally encoding of the time to TCA, wherein each said encoded CDM record is a token for transformer-based machine-learning model.

In an embodiment, the embedding the conjunction parameter into an embedded encoding is carried out by an artificial neural-network, in particular a single linear layer artificial neural-network.

In an embodiment, the positionally encoding of the time to TCA is carried out by generating a vector comprising values generated as a function of time to TCA.

In an embodiment, the positionally encoding of the time to TCA is carried out by generating a vector comprising values generated as a function of time to TCA defined by:

$$PE_{time,2i} = \sin\left(\frac{time}{\maxtime^{\frac{2i}{d_{model}}}}\right)$$

$$PE_{time,2i+1} = \cos\left(\frac{time}{\maxtime^{\frac{2i}{d_{model}}}}\right)$$

where time is the time to TCA to be positionally encoded, maxtime is a scaling parameter, i is the dimension, and $d_{model}$ is the representation dimension, in particular maxtime is the maximum time to TCA received in the dataset.

In an embodiment, said method further comprising the preparatory step of receiving said predetermined time to TCA threshold.

In an embodiment, the conjunction parameter is a spatial conjunction parameter.

In an embodiment, the spatial conjunction parameter comprises a position uncertainty at the time of closest approach.

In an embodiment, the spatial conjunction parameter comprises the position uncertainty at the time of closest approach and at least one other CDM-related parameter.

In an embodiment, the CDM array has a number of columns equal to the highest number of CDM records for any conjunction time series.

In an embodiment, the CDM array has a number of rows equal to the number of received conjunction time series.

In an embodiment, each masked CDM record of the CDM array is padded, in particular padded with a value or string indicative of masking or padded with a null value or padded with a zero value.

In an embodiment, empty cells of the CDM array are padded, in particular padded with a value or string indicative of padding or padded with a null value or padded with a zero value.

In an embodiment, said method comprising deleting any row for a conjunction time series of the generated CDM array if the number of CDM records is lower than a predetermined minimum CDM number and/or the if the number of unmasked CDM records is lower than a predetermined minimum unmasked CDM number.

In an embodiment, said method comprising applying a self-attention layer within the transformer encoder and decoder to capture contextual dependencies from input data; and/or applying a multi-head attention layer within the transformer encoder and decoder to capture contextual dependencies within the input data.

In an embodiment, said method further comprising the step of outputting the trained transformer-based machine-learning model.

It is also disclosed a trained transformer-based machine-learning model obtainable by the method previously described.

It is further disclosed a computer-implemented method for predicting a conjunction parameter from conjunction data messages, CDM, wherein a conjunction is a pair of orbiting objects, using the trained transformer-based machine-learning model of the previously described, the method comprising: feeding as input to the trained transformer-based machine-learning model a conjunction time series for each of the one or more conjunctions to be predicted, wherein each said series comprises a plurality of received CDM records, each received CDM record comprising a time to TCA, Time to Closest Approach, and a conjunction parameter, and a plurality of prediction CDM records to be predicted, each prediction CDM record comprising a periodic time stamp with a predetermined period and a masked conjunction parameter; outputting predicted CDM records from the output of trained transformer-based machine-learning model.

In an embodiment, the method for predicting a conjunction parameter from conjunction data messages comprising sending the predicted CDM records as conjunction data messages, CDM.

It is further disclosed a device comprising a computer-readable medium comprising the trained transformer-based machine-learning model previously described.

It is also disclosed a computer configured to carry out the method for predicting a conjunction parameter from conjunction data messages or the respective method for training a transformer-based machine-learning model.

It is also disclosed a computer-readable medium comprising computer program instructions that when executed by a computer cause it to carry out the method for predicting a conjunction parameter from conjunction data messages or the respective method for training a transformer-based machine-learning model.

In the present disclosure, the attention mechanism enables the model to focus on relevant information and learn meaningful representations from long-range dependencies, making it particularly well-suited for processing sequential data with complex structures.

BRIEF DESCRIPTION OF THE DRAWINGS

The following figures provide preferred embodiments for illustrating the disclosure and should not be seen as limiting the scope of invention.

FIG. 5: Graphical representation of an embodiment of data preparation using 5 conjunctions.

FIG. 6: Graphical representation of an embodiment of prediction cut-off threshold definition.

DETAILED DESCRIPTION

The present document discloses using a machine learning model based on Transformers to forecast the position uncertainty of objects involved in close encounters, with a particular emphasis on secondary objects like debris, which tend to exhibit greater unpredictability.

Transformer-based models [3] are a class of state-of-the-art deep learning architectures. They capture multiscale effects by creating a succession of self-attention layers. Such an attention mechanism can effectively model dependencies between different positions in a sequence, and in this mode, the model develops robust predictions. The present disclosure shows that transformers are surprisingly well-suited to predicting the position uncertainty of space objects at the time of closest approach.

Herein it is leveraged the power of Transformer-based models with the goal of forecasting the position uncertainty of space objects in close encounters. Thus, surpassing the limitations of conventional approaches such as LSTMs.

The Transformer consists of an encoder-decoder architecture, where both the encoder and decoder are composed of multiple layers. Each layer, known as a Transformer block, consists of two sub-layers: a multi-head self-attention mechanism and position-wise feedforward neural networks.

The multi-head self-attention mechanism computes attention weights, for each token, in the sequence with respect to all other words in the sequence, allowing the model to focus on different aspects of the input context. The position-wise feedforward neural networks introduce non-linearity and further transform the representations learned from the self-attention mechanism. For example, in natural language processing, a token refers to a word or part of a word. On the other hand, in the context of time series forecasting, a token refers to a time step.

By leveraging the Transformer's self-attention mechanism and parallel processing capabilities, its application is extended to time series forecasting tasks, i.e. Transformer-based forecasting model.

Figures 3, 4:
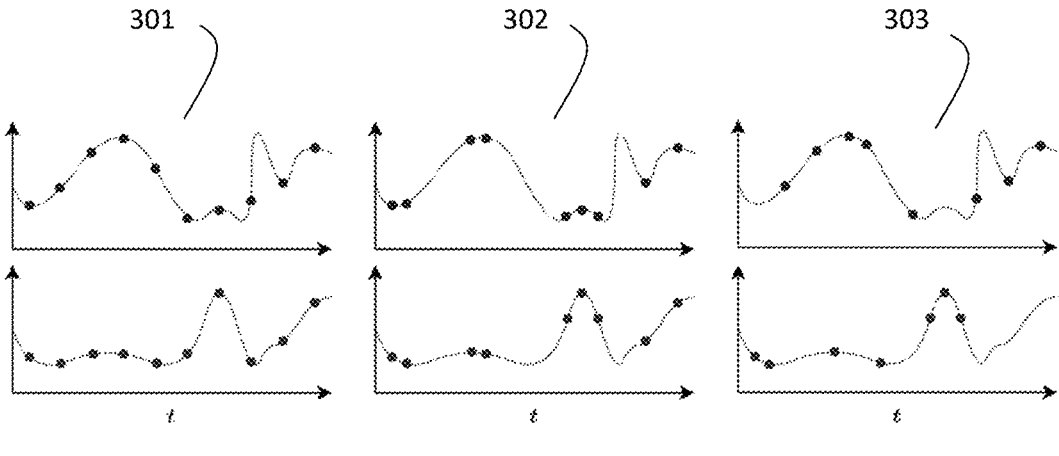
FIG. 3: Illustration of regular, irregular aligned, and irregular unaligned sampling for multivariate time series.
FIG. 4: Illustration of an embodiment of a data representation.

FIG. 3 shows an illustration of regular (301), irregular aligned (302), and irregular unaligned (303) sampling for multivariate time series. In this example, two distinct series are presented in each use case (up and down).

In an embodiment, the variables of the multivariate time series comprise a Time of Closest Approach (TCA), time to TCA, a position uncertainty of at least one orbiting object, a relative distance between a pair of orbiting objects, a relative velocity between a pair of orbiting objects, a set of coordinates of position and velocity of each orbiting object, or a combination of any of these.

As the conjunction occurs, the information is updated via CDMs. Therefore, each time series comprises a plurality of CDMs. In the case of the low-Earth orbit regime, such CDMs are usually issued 7 days before the closest approach. Based on historical information, a short time series event can be considered if the number of issued CDMs per conjunction is ~3.

In an embodiment, the minimum number of CDMs per conjunction is between 3 and 20 CDMs, more preferably 3 CDMs.

For the operators, having only 1 CDM is not relevant as no proactive measure can be taken based on that single sample. So, usually those cases are dropped/ignored.

Each time series is defined by a conjunction event. Each conjunction is established between a pair of objects with the expected time of closest approach within a certain interval. The number of conjunctions, i.e., time series involved in the problem can be in the order of thousands and is expected to increase throughout the years.

The measurements from which the CDMs are retrieved are performed at irregular intervals and, therefore, the time series is scarce with non-equidistant observation time points.

The collection of CDMs issued for each conjunction depends on different factors such as the type of orbit and the dimension of the objects. Therefore, the collection of observation times across all the time series can also differ between conjunctions.

FIG. 3 illustrates the difference between regular and irregular, aligned and unaligned sampling. As mentioned, the setup faced in the current problem can be represented as being multivariate irregular and unaligned sampling (as shown in FIG. 3 right).

Thus, finding the best solution to represent such data and use it as input for the Transformer-based model, is a critical step in the proposed pipeline.

Given that the goal is to train a deep learning model, it is needed that the input data is represented by a regular matrix-like shape.

FIG. 4 shows an illustration of an embodiment of a data representation. Each row represents a conjunction, and the CDMs are ordered from the left to the right by creation date.

As can be seen in FIG. 4, an array is built in such a way that each row represents a single conjunction, meaning that the number of rows equals the number of conjunctions being considered as input data to the model. Since the number of CDMs differs from conjunction to conjunction, the maximum number of CDMs in a given conjunction defines the maximum sequence length of the array. In the example shown in FIG. 4, the number of conjunctions is 5, and the sequence length is 10, as it is the maximum number of CDMs seen in a conjunction. Note that within each conjunction, the CDMs are ordered by creation date or, in other words, in descending order of time to time of closest approach. All conjunctions are aligned on the right, including CDMs to be predicted or to be used for training, which means that the last column is the one presenting the information closer to the time of closest approach.

Since each conjunction has a different size, the remaining tokens are padded (tokens represented on the left in grey in FIG. 4).

In the context of deep learning, padding refers to the technique of adding additional elements (often zeros) to the input data to ensure that the data meets certain requirements, in this case, it is related to the size of the data.

One of the goals is to perform forecasting, such a representation also accounts for the tokens to be predicted by the model, i.e., the ones represented in grey shade with reference 'CDM' on the right in FIG. 4. s.

In an embodiment, if one wants to forecast the position uncertainty values after the cut-off of two days before the time of closest approach, all the tokens after such a threshold are used as labels of the model.

It is important to highlight the need to define a minimum number of samples to be used as features. Defining a minimum number of samples to be used as features is an important consideration for the skilled person, particularly in the context of forecasting. This number not only determines the quantity of historical context available to the model but also plays a role in mitigating the impact of outliers on predictions. Increasing the minimum number of samples can often lead to enhanced performance, as the model gains access to a more extensive historical context for pattern recognition. However, it is important to recognise that an excessively high minimum sample count means that the number of conjunctions to be used might not be sufficient to achieve a good performance. Contrarily, setting the minimum number of samples too low could result in the model being more sensitive to outliers due to its limited historical perspective. Such a scenario could lead to inaccurate forecasts, as the model may struggle to differentiate between genuine trends and the effects of outliers.

For example, suppose the following scenario with 5 conjunctions. The numbers within the squares indicate the time to time of closest approach of each token.

FIG. 5 shows a graphical representation of an embodiment of data preparation using 5 conjunctions. Padding is performed on the left and it is represented by the samples in grey.

Once the CDMs are ordered, the next step consists of choosing the samples to be used as features and the ones to be used as labels. To this end, one must specify at which cut-off the forecast is being performed. Assuming such a cut-off to be at 2 days prior to the time of closest approach, one obtains the setup described in FIG. 6.

FIG. 6 shows a graphical representation of an embodiment of prediction cut-off threshold definition, wherein 601 represents the samples marked in grey on the right to be used as labels.

As can be seen in FIG. 6, the first conjunction does not have labels, meaning that it cannot be used in a supervised learning task. Thus, such a sample can be discarded given the chosen cut-off.

At this point, one must decide the minimum number of samples to be used as features. Next it is shown the resulting samples when the minimum number is set to 2 (FIG. 7A) or 3 (FIG. 7B).

Figures 7A, 7B, 8:
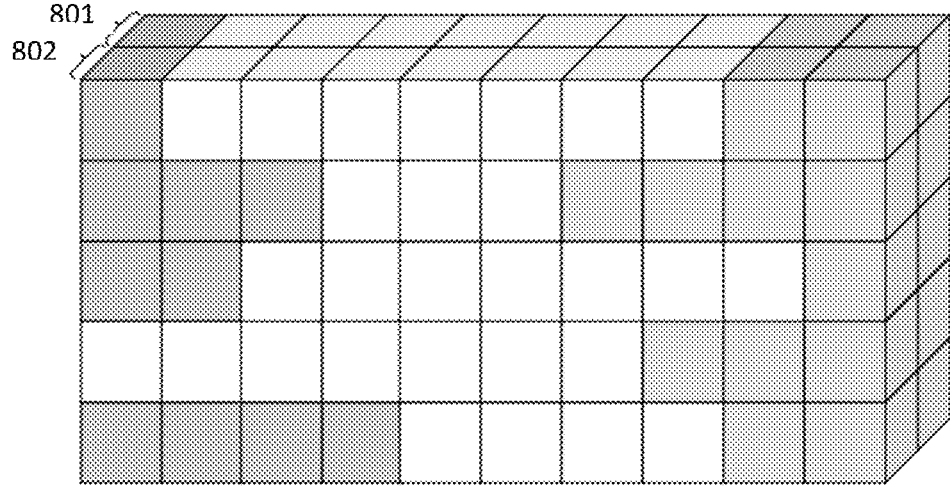
FIGS. 7A and 7B: Graphical representation of an embodiment of choosing different minimum number of samples to be used as features.
FIG. 8: Illustration of an embodiment of data representation containing a new dimension to accommodate the information being used.

FIGS. 7A and 7B show a graphical representation of an embodiment of choosing different minimum number of samples to be used as features.

Note that, for simplicity, not all the information from the CDMs is being used. The introduction of other input features is discussed herein.

At this point, only the position uncertainty and the time to time of closest approach is being considered. Thus, in fact, the array has another dimension containing such information, as shown in FIG. 8.

FIG. 8 shows an illustration of an embodiment of data representation containing a new dimension to accommodate the information being used, wherein 801 represents a time to TCA, and 802 represents a position uncertainty.

Figure 1:
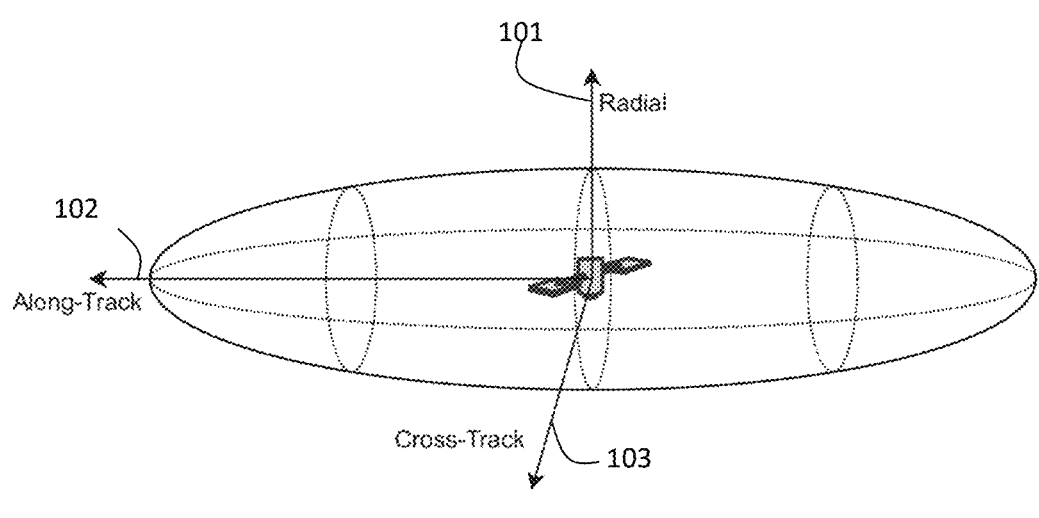
FIG. 1: Graphical representation of a satellite position uncertainty.
Figure 2:
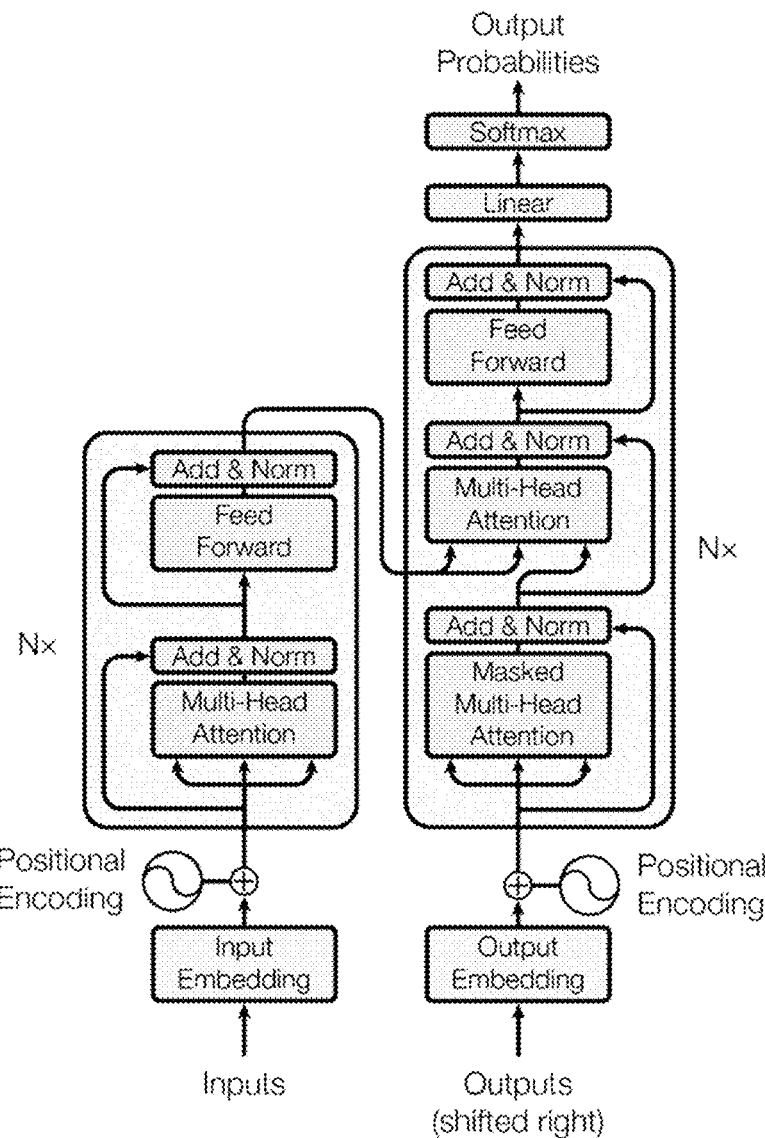
FIG. 2: Graphical representation of an embodiment of a Transformer model architecture.

Different Transformer-based solutions can be considered in the context of this problem, such as the typical Encoder-Decoder setup (FIG. 2), the Decoder-only approach [16] or the Encoder-only one [17]. However, due to the challenges presented previously, the best choice relies on setups that consider the Encoder in its architecture, i.e., Encoder-Decoder and Encoder-only setups.

In an embodiment, the machine learning model is a transformer-based machine learning model, namely an Encoder-Decoder model, more preferably an Encoder-only model.

Since the goal is to perform forecasting, i.e., to predict the evolution of the variable at the desired time steps, it is important to consider the need to learn the representation of such time steps. This is indeed the major drawback of an Encoder-Decoder model due to the decoder's autoregressive nature which limits its ability to use future context effectively. Thus, the choice of proceeding with an Encoder-only architecture is natural as it can simultaneously consider past and future data points.

In time series forecasting problems, one of the most critical challenges is to effectively capture and represent the temporal dependencies in the data. One of the key components of Transformer-based models is the use of embeddings to represent the input data. It is important to have good embedding representations when combining different information for the model to be able to capture the relationships or dependencies between each feature.

The proposed data representation setup (FIG. 8) focused on preparing the data to overcome the challenge of having multivariate irregularly unaligned sampled time series. However, when aggregating the data in such a manner, the timestamp information was only kept in the dimension of the features. In order for the model to consider this information, a combined representation of the timestamps and the scalars (i.e., the position uncertainty at the time of closest approach) is needed.

Developing on the encoding proposed by Zhou et al. [14], it was decided to compute the positional encoding using the timestamps. To this end, different techniques can be used, such as learnable layers or the standard positional encoding proposed by Vaswani et al. [3] in the original Transformer. It was decided to proceed with the latter approach as the two versions produced nearly identical results and such a method does not increase the number of learnable parameters.

The idea behind positional encoding is to generate a vector where the values are determined by the position of the element in the sequence. The standard positional encoding approach uses sine and cosine functions of different frequencies to generate such vectors. The following equation shows the standard positional encoding approach $$PE_{(pos,2i)} = \sin\left(\frac{pos}{10000^{\frac{2i}{d_{model}}}}\right)$$

-continued $$PE_{pos,2i+1} = \cos\left(\frac{pos}{10000^{\frac{2i}{d_{model}}}}\right)$$

where pos is the position index, i is the dimension, and $d_{model}$ is the representation dimension.

To leverage the timestamps, a revised version of this method was used:

$$PE_{time,2i} = \sin\left(\frac{time}{\max time^{\frac{2i}{d_{model}}}}\right)$$

$$PE_{time,2i+1} = \cos\left(\frac{time}{\max time^{\frac{2i}{d_{model}}}}\right)$$

where instead of the position index, there is a time variable, corresponding to the timestamp, time, which is continuous.

Note that instead of the empirical value 10 000, now a maximum time, maxtime, is used. This is due to the fact that as the maximum time increases, the distance between time embeddings becomes smaller and, consequently, the representation of consecutive stamps might be too similar. To avoid this problem, a maximum time is set. Since the data being used in this example consists of CDMs issued in the low-Earth orbit regime, it is guaranteed that the maximum value that the stamps can take is around 7 days.

For the scalar embedding, similar to the original architecture (FIG. 2), a linear layer is used to generate the embedding representation of the scalars as it provides a simple and effective method for capturing the relationships in the continuous data.

For the Mask Token Embedding, to avoid data leakage, the position uncertainty values used as labels, i.e., the tokens represented in grey shade on the right in FIG. 4, cannot be used to train the model. The only information from these tokens that can be shared is the time stamps.

Thus, a solution is needed for these scalars. To this end, a method inspired by the approach used by Devlin [17] was used. In the referred study, the authors consider a unique token, e.g. "[MASK]", to represent a value that one wishes to predict. In other words, the task of the output layer is to predict the token that was replaced by "[MASK]". To obtain the embedding representation of such a token, a trainable vector can be used.

Figure 9:
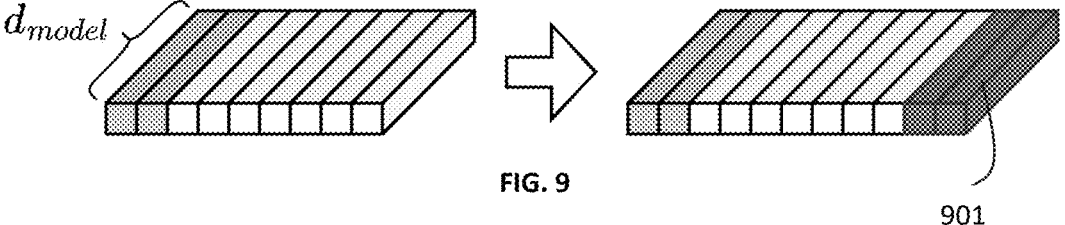
FIG. 9: Graphical representation of a mask embedding applied to one sample.

FIG. 9 shows a graphical representation of a mask embedding applied to one sample, wherein 901 represents a trainable vector.

In the time series setup, to obtain the embedding representation of such a token, a trainable vector 901 can be used in the steps where a correspondent label exists. Note that the masking occurs after applying the scalar embedding layer and, thus, the input features are now represented in a different dimensional space, here denoted as dmodel.

There are many choices of methods to combine the embeddings. The one originally proposed by Vaswani et al. [3] consists of simply summing the representations. This step is denoted by the sign $\oplus$ in FIG. 10.

Figure 10:
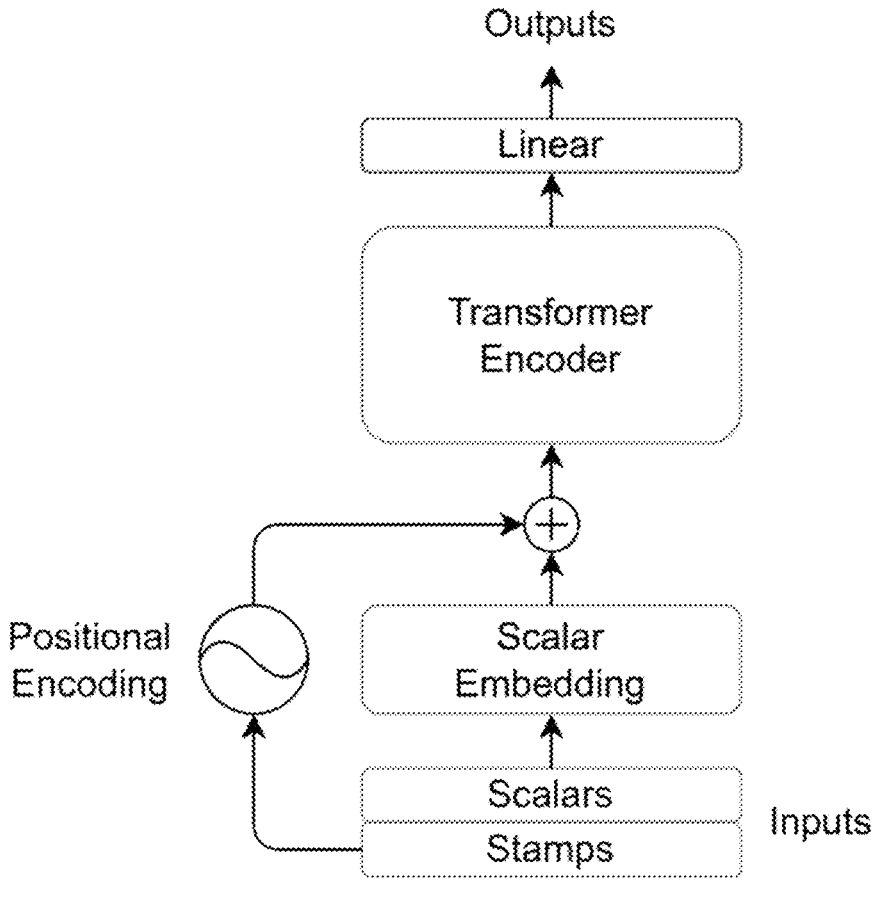
FIG. 10: Flowchart of an embodiment of an encoder-only model architecture.

FIG. 10 shows a flowchart of an embodiment, of an encoder-only model architecture.

Another approach consists of using learnable weights before adding the embeddings. With a learnable weighting mechanism, the model can learn to weigh the importance of each embedding representation. This is especially useful when the relationship between the timestamp and scalar modalities is complex, and the model can learn to extract the relevant information through the training process.

In fact, this method subsumes the adding/standard approach as the latter can be seen as the special case where both weights are equal to one. Thus, with learnable values, the expressivity of the network increases and, consequently, can lead to better results.

In an another embodiment, the data is concatenated instead of summing and using a linear layer to bring the data back to dimension $d_{model}$, or using convolutional layers instead. In other words, one could increase the complexity of the network even further. However, after some experiments, it was seen that the best-performing model was the one using learnable embedding weights or the standard solution.

Therefore, it can be concluded that as the network's expressivity increased, the model's performance was not linear. In fact, from the standard model to the learnable embedding weights the performance improved (or achieved the same results, depending on the input data distribution), but from the next model onwards, the performance degraded, achieving worse performance than the standard setup.

The results showed that a larger space of solutions does not necessarily lead to improved performance. In fact, the solutions/hypothesis space should be restricted, i.e., an inductive bias should be considered. This is especially true in a small-data regime, which is the current scenario faced.

The choice of embedding representation is an important feature of inductive bias. Thus, the way the input data is represented can significantly impact the quality of the learned solutions and the generalisation capacity of the model.

A major drawback of the Encoder-only architecture is that the model does not take into account the natural sequence in which each step is generated. This is due to the fact that the attention layers consider all the steps at once and, thus, a causal relationship is not being considered. However, such a relationship can be introduced in the model by using a causal mask.

While the causal mask enables the model to attend only to preceding steps during self-attention, it is crucial to consider its implications, particularly when dealing with input sequences consisting of a very limited number of tokens. In scenarios where the input data contains only a few tokens, the introduction of a causal mask can exacerbate the challenges posed by the short sequence length. As each token's attention is further restricted by the causal mask, the tokens attend to even less information, potentially leading to decreased performance.

The interplay between sequence length, causal masking, and model performance necessitates a nuanced approach, wherein the introduction of a causal mask should be carefully evaluated based on the available data and the desired forecasting accuracy.

Figure 11:
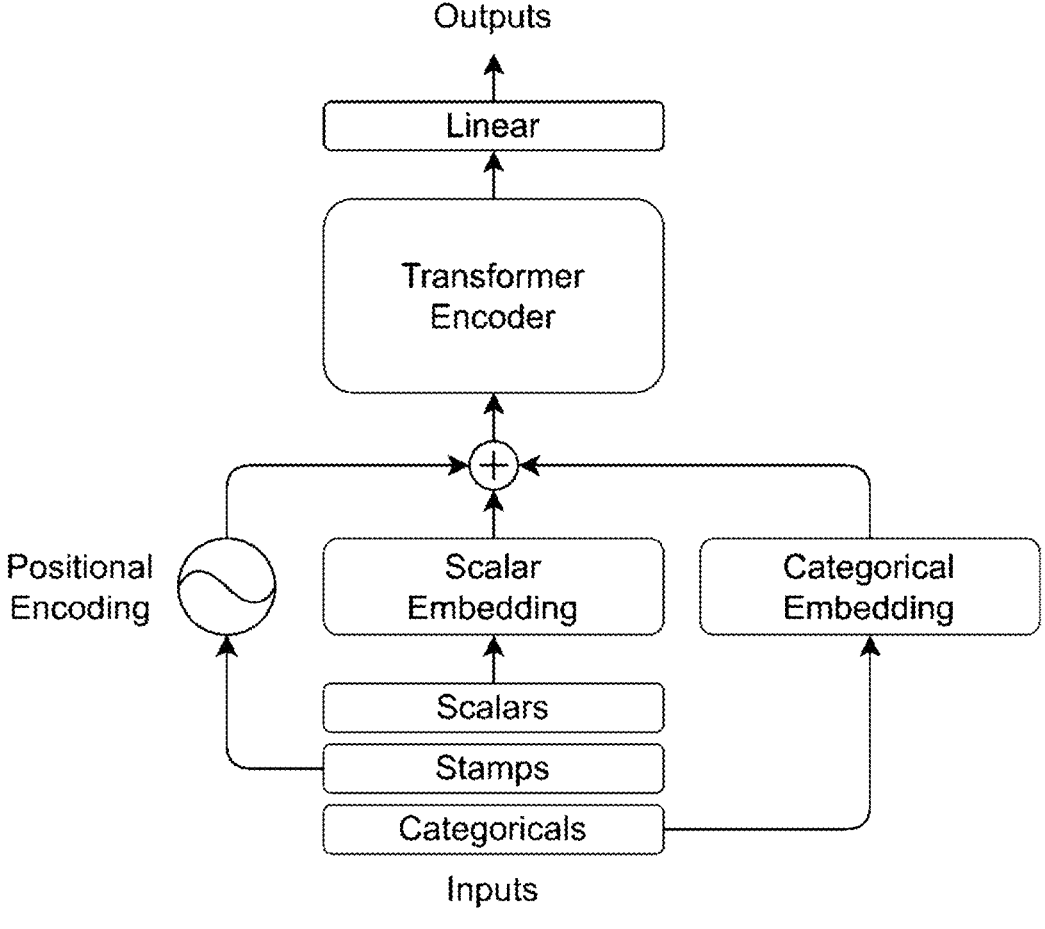
FIG. 11: Flowchart of an embodiment of an encoder-only model architecture with categorical embedding.

FIG. 11 shows a flowchart of an embodiment of an encoder-only model architecture with categorical embedding.

As mentioned previously, more features could be considered as input data to the model. Similar to what was done with the timestamps, one could simply extend the new dimension introduced in FIG. 8 to include the desired features.

Depending on the data type, different layers can be considered to map the embeddings to the same dimension. For example, when dealing with categorical features, which typically are discrete and represented mainly by strings, embedding tables can be used to convert them into a continuous representation [18]. Once all the features have been mapped to the same dimension in Euclidean space, the outputs of these layers are then fused to create a single feature representation, as seen previously.

For the Model Uncertainty Estimation, as previously mentioned, it is crucial for practical applications to measure the uncertainty associated with the predictions generated by machine learning models. Although deep learning approaches are powerful, they often lack interpretability which makes it challenging for operators to trust the outputs of neural networks. This is also the case with the chosen Transformer architecture.

In an embodiment, the input data comprises one or more variables that not optimized or not part of a prediction interest, thus being advantageous for improving the model performance. For example, static values such as scalar values like the mass of the orbiting object, or categorical values like type of orbiting object, e.g. debris or payload.

However, there are some techniques that can be easily applied to such an architecture to incorporate the estimation of the model uncertainty. Some examples are the Monte Carlo dropout [19] and the quantile regression formulation presented by Lim et al. [15].

It is important to highlight that different techniques might measure different levels of uncertainty: epistemic and aleatoric. Thus, one must choose the appropriate technique given the desired output.

As seen in FIG. 4 and FIG. 8, the grey squares indicate the steps where padding is applied, and the in grey shade on the right ones indicate the labels to be predicted. Such a setup works well with the Encoder-only architecture, as the temporal dimension of each token is added in the positional encoding. Besides, one can inform the model when the next CDMs will be received, i.e., encode the in grey shade on the right squares the same way as the white ones. This approach is used during training and validation.

However, during inference time, i.e., once the model is in production, one does not know when the next conjunction data message will arrive, i.e., for which step to predict. Therefore, one needs to perform predictions at regular-spaced steps (blank squares in FIG. 12A). Such steps can be defined to be equidistant intervals of one hour, or any other desired interval.

Once a conjunction data message arrives (in grey shade on the right squares in FIG. 13) one can use the real value to compute the desired metrics to evaluate the performance of the model.

Figure 12A:
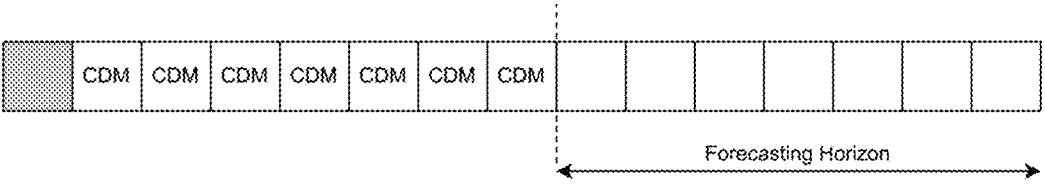
FIGS. 12A and 12B: Graphical representations of an embodiment of a data setup for the inference stage.
Figure 12B:
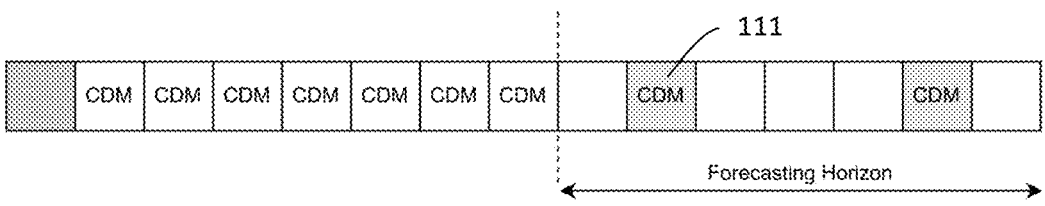

FIGS. 12A and 12B show a graphical representation of an embodiment of a data setup for the inference stage, wherein 111 represents the steps in which a real value exists and, thus, can be compared with the corresponding predicted values. The dashed line separates the features (on the left) from the labels (on the right).

Figure 13:
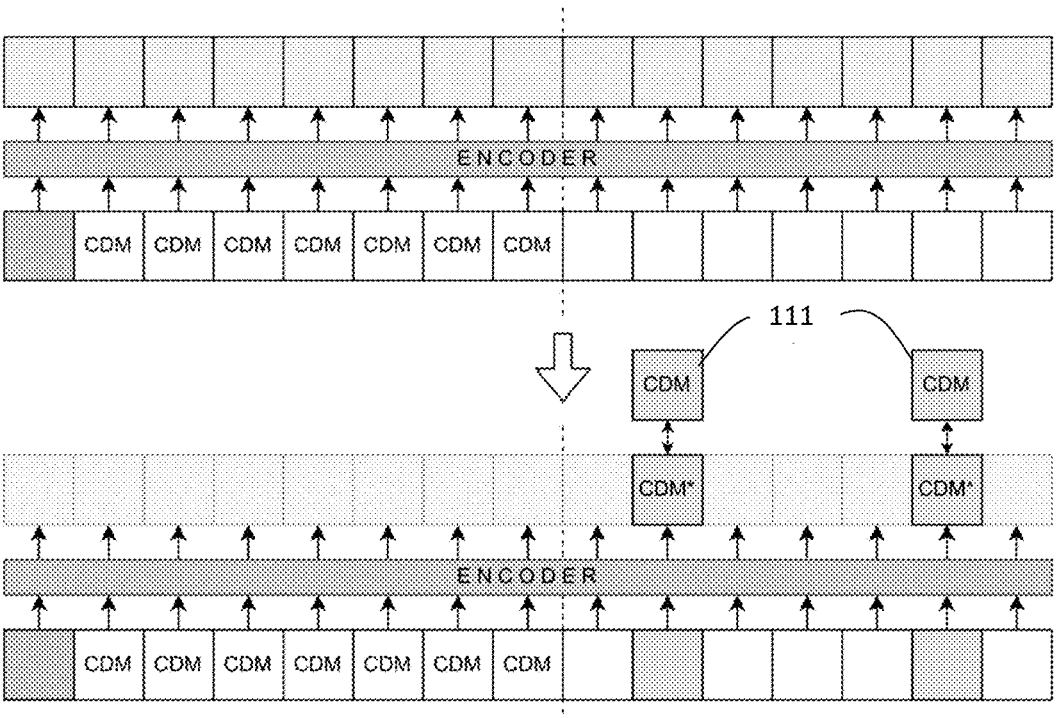
FIG. 13: Graphical representation of an embodiment of an inference setup.

FIG. 13 shows a graphical representation of an embodiment of an inference setup, wherein 111 represents the desired predicted values.

Figure 14:
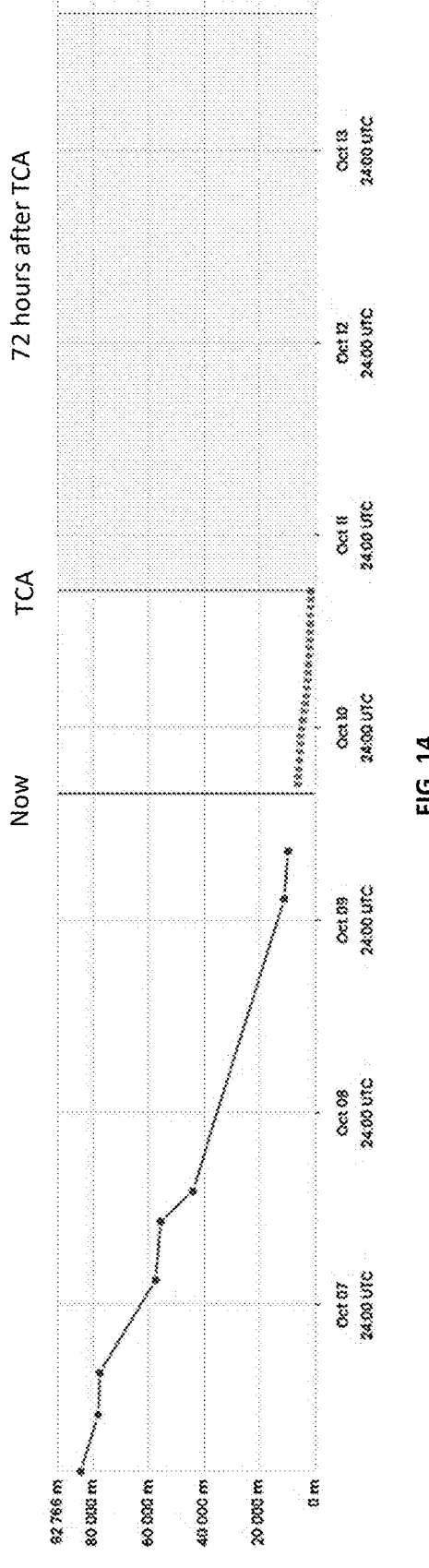
FIG. 14: Graphical representation of a position uncertainty forecast of a given space object.

FIG. 14 shows a graphical representation of a position uncertainty forecast of a given space object, which received 8 CDMs up to the moment of "Now".

In fact, what the model is doing is generating a new representation for all the tokens as represented by the grey tokens in the diagram presented at the top in FIG. 13. Then, one uses only as model predictions the desired outcomes, as represented in the bottom diagram in FIG. 13. In other words, since a real value was issued in the steps highlighted in 111, the chosen model outcomes are the tokens denoted as CDM*. The performance of the model can later be evaluated by computing the error between the predicted tokens, CDM*, and the real ones, CDM.

This approach not only facilitates model evaluation and metrics computation but also informs operators of estimated space object trends (FIG. 14).

In an embodiment, the position uncertainty forecast of a given space object is given at a pre-defined time step, in particular for every upcoming hour.

The presented document proposes a novel machine learning approach using Transformer-based models to forecast the position uncertainty of objects involved in a close encounter. By surpassing the limitations of conventional approaches used in previous related work, and the challenges of the complex nature of the data and how such data is provided in real-life operations.

Compare the performance of the disclosed model with other state-of-the-art solutions and a naïve baseline approach, showing that the proposed solution can improve the safety and effectiveness of spacecraft operations significantly.

The term "comprising" whenever used in this document is intended to indicate the presence of stated features, integers, steps, components, but not to preclude the presence or addition of one or more other features, integers, steps, components, or groups thereof.

The disclosure should not be seen in anyway restricted to the embodiments described and a person with ordinary skill in the art will foresee many possibilities to modifications thereof.

The above-described embodiments are combinable.

The following claims further set out particular embodiments of the disclosure.

REFERENCES

[1] ESA Space Debris Office. ESA'S Annual Space Environment Report. 2023.

[2] Donald J. Kessler and Burton G. Cour-Palais. Collision Frequency of Artificial Satellites: The creation of a Debris Belt. Journal of Geophysical Research: Space Physics, 83: 2637-2646, 1978. doi: 10.1029/JA083iA06p02637.

[3] Ashish Vaswani, Noam Shazeer, Niki Parmar, Jakob Uszkoreit, Llion Jones, Aidan N Gomez, t ukasz Kaiser, and Illia Polosukhin. Attention is All you Need. In I. Guyon, U. Von Luxburg, S. Bengio, H. Wallach, R. Fergus, S. Vishwanathan, and R. Garnett, editors, Advances in Neural Information Processing Systems, volume 30. Curran Associates, Inc., 2017.

[4] Benjamin Bastida Virgili, Tim Flohrer, Holger Krag, Klaus Merz, and Stijn Lemmens. CREAM: ESA's Proposal for Collision Risk Estimation and Automated Mitigation. 1$^{st}$ International Orbital Debris Conference, 2019.

[5] Sascha Metz. Master Thesis: Implementation and comparison of data-based methods for collision avoidance in satellite operations. 2020. doi: 10.13140/ RG.2.2.35021.26089.

[6] Christopher M. Bishop. Pattern Recognition and Machine Learning (Information Science and Statistics). Springer-Verlag, Berlin, Heidelberg, 2006. ISBN 0387310738.

[7] Sepp Hochreiter and Jurgen Schmidhuber. Long short-term memory. Neural Comput., 9 (8):1735-1780, nov 1997. ISSN 0899-7667. doi: 10.1162/neco.1997.9.8.1735.

[8] I. F. Stroe, P. B. Ilioaica A. D. Stanculescu, C. F. Blaj, M. A. Nita, A. F. Butu, D. Escobar, J. Tirado, B. Bija, and D. Saez. AUTOCA: Autonomous Collision Avoidance System. 8$^{th}$ European Conference on Space Debris, 2021.

[9] Dzmitry Bahdanau, Kyunghyun Cho, and Yoshua Bengio. Neural Machine Translation by Jointly Learning to Align and Translate. International Conference on Learning Representations (ICLR), 2014.

[10] Thang Luong, Hieu Pham, and Christopher D. Manning. Effective approaches to attention-based neural machine translation. In Proceedings of the 2015 Conference on Empirical Methods in Natural Language Processing, pages 1412-1421. Association for Computational Linguistics, 2015. doi: 10.18653/v1/D15-1166.

[11] Francesco Pinto, Giacomo Acciarini, Sascha Metz, Sarah Boufelja, Sylvester Kaczmarek, Klaus Merz, Jose A. Martinez-Heras, Francesca Letizia, Christopher Bridges, and Atilim Gunes Baydin. Towards Automated Satellite Conjunction Management with Bayesian Deep Learning. 2020.

[12] Yann LeCun, Yoshua Bengio, and Geoffrey Hinton. Deep learning. nature, 521(7553): 436, 2015.

[13] Qingsong Wen, Tian Zhou, Chaoli Zhang, Weiqi Chen, Ziqing Ma, Junchi Yan, and Liang Sun. Transformers in time series: A survey. International Joint Conference on Artificial Intelligence (IJCAI), 2023.

[14] Haoyi Zhou, Shanghang Zhang, Jieqi Peng, Shuai Zhang, Jianxin Li, Hui Xiong, and Wancai Zhang. Informer: Beyond Efficient Transformer for Long Sequence Time-Series Forecasting. In The Thirty-Fifth AAAI Conference on Artificial Intelligence, AAAI 2021, Virtual Conference, volume 35, pages 11106-11115. AAAI Press, 2021.

[15] Bryan Lim, Sercan O. Ank, Nicolas Loeff, and Tomas Pfister. Temporal fusion transformers for interpretable multi-horizon time series forecasting. International Journal of Forecasting, 37(4):1748-1764, 2021. ISSN 0169-2070. doi: https://doi.org/10.1016/j.ijforecast.2021.03.012.

[16] Alec Radford, Karthik Narasimhan, Tim Salimans, and Ilya Sutskever. Improving language understanding by generative pre-training. 2018.

[17] Jacob Devlin, Ming-Wei Chang, Kenton Lee, and Kristina Toutanova. BERT: Pre-training of deep bidirectional transformers for language understanding. In Proceedings of the 2019 Conference of the North American Chapter of the Association for Computational Linguistics: Human Language Technologies, Volume 1 (Long and Short Papers), pages 4171-4186, Minneapolis, Minnesota, June 2019. Association for Computational Linguistics. doi: 10.18653/v1/N19-1423.

[18] Tomas Mikolov, Kai Chen, Greg S. Corrado, and Jeffrey Dean. Efficient Estimation of Word Representations in Vector Space. Proceedings of Workshop at ICLR, 2013. URL http://arxiv.org/abs/1301.3781.

[19] Yarin Gal and Zoubin Ghahramani. Dropout as a bayesian approximation: Representing model uncertainty in deep learning. International Conference on Machine Learning, 2016.

The invention claimed is:

1. A computer-implemented method for training a transformer-based machine-learning model for predicting a conjunction parameter from conjunction data messages, CDMs, wherein a conjunction is a pair of orbiting objects, the method comprising:

receiving a dataset comprising a conjunction time series for each conjunction, wherein each said series is irregularly spaced and comprises a plurality of CDM records, each CDM record comprising a time to TCA, Time of Closest Approach, and a conjunction parameter;

generating a CDM array comprising a plurality of cells, one cell for each CDM record, organized in rows, one row for each conjunction time series, and a plurality of columns, where each row is right-aligned such that a rightmost column of the CDM array comprises the most recent CDM record for each conjunction time series;

generating a mask for the CDM array where each CDM record is masked if the time to TCA of said each CDM record is lower than a predetermined time to TCA threshold;

encoding each CDM record of the CDM array by embedding the conjunction parameter into an embedded encoding using an artificial neural-network;

training a transformer-based machine-learning model by using, as training input, the CDM array masked by said mask and using, as training output, the CDM array, wherein each said CDM record is a token for transformer-based machine-learning model, wherein the conjunction parameter is a spatial conjunction parameter which comprises a position uncertainty at the TCA.

2. The method according to claim 1, wherein the encoding further comprises:

positionally encoding the time to TCA; and combining the embedded encoding of the conjunction parameter with the positionally encoding of the time to TCA by summing the embedded encoding of the conjunction parameter with the positionally encoding of the time to TCA, wherein each said encoded CDM record is a token for transformer-based machine-learning model.

3. The method according to claim 1, wherein the embedding of the conjunction parameter into an embedded encoding is carried out by a single linear layer artificial neural-network.

4. The method according to claim 2, wherein the positionally encoding of the time to TCA is carried out by generating a vector comprising values generated as a function of time to TCA.

5. The method according to claim 4, wherein the positionally encoding of the time to TCA is carried out by generating a vector comprising values generated as a function of time to TCA defined by:

$$PE_{time,2i} = \sin\left(\frac{time}{\maxtime^{\frac{2i}{d_{model}}}}\right)$$

$$PE_{time,2i+1} = \cos\left(\frac{time}{\maxtime^{\frac{2i}{d_{model}}}}\right)$$

where time is the time to TCA to be positionally encoded, maxtime is a scaling parameter, i is the dimension, and $d_{model}$ is the representation dimension, in particular maxtime is the maximum time to TCA received in the dataset.

6. The method according to claim 1, further comprising a preparatory step of receiving said predetermined time to TCA threshold.

7. The method according to claim 1, wherein the spatial conjunction parameter comprises the position uncertainty at the time of closest approach and at least one other CDM-related parameter.

8. The method according to claim 1, wherein the CDM array has at least one of a number of columns equal to a highest number of CDM records for any conjunction time series and a number of rows equal to a number of received conjunction time series.

9. The method according to claim 1, wherein each masked CDM record of the CDM array is padded with a value or string indicative of masking or padded with a null value or padded with a zero value, and wherein empty cells of the CDM array are padded with a value or string indicative of padding or padded with a null value or padded with a zero value.

10. The method according to claim 1, further comprising deleting any row for a conjunction time series of the CDM array if a number of CDM records is lower than a predetermined minimum CDM number or if a number of unmasked CDM records is lower than a predetermined minimum unmasked CDM number.

11. The method according to claim 1, further comprising applying a self-attention layer within the transformer encoder and decoder to capture contextual dependencies from input data; and applying a multi-head attention layer within the transformer encoder and decoder to capture contextual dependencies within the input data.

12. A computer-implemented method for predicting a conjunction parameter from CDMs using the transformer-based machine-learning model trained according to claim 1, the method comprising:

feeding as input to the trained transformer-based machine-learning model a conjunction time series for each of the one or more conjunctions to be predicted, wherein each said series comprises a plurality of received CDM records, each received CDM record comprising a time to TCA, Time to Closest Approach, and a conjunction parameter, and a plurality of prediction CDM records to be predicted, each prediction CDM record comprising a periodic time stamp with a predetermined period and a masked conjunction parameter;

outputting predicted CDM records from the output of trained transformer-based machine-learning model, wherein the conjunction parameter is a spatial conjunction parameter which comprises a position uncertainty at the time of closest approach.

13. The computer implemented method according to claim 12, wherein the predicted CDM records are sent as CDMs.

14. A device comprising a non-transitory computer-readable medium, the non-transitory computer-readable medium having stored thereon instructions that, when executed by the device, cause the device to train a transformer-based machine-learning model for predicting a conjunction parameter from conjunction data messages, CDMs, wherein a conjunction is a pair of orbiting objects, by:

receiving a dataset comprising a conjunction time series for each conjunction, wherein each said series is irregularly spaced and comprises a plurality of CDM records, each CDM record comprising a time to TCA, Time of Closest Approach, and a conjunction parameter;

generating a CDM array comprising a plurality of cells, one cell for each CDM record, organized in rows, one row for each conjunction time series, and a plurality of columns, where each row is right-aligned such that a rightmost column of the CDM array comprises the most recent CDM record for each conjunction time series;

generating a mask for the generated CDM array where each CDM record is masked if the time to TCA of said each CDM record is lower than a predetermined time to TCA threshold;

encoding each CDM record of the CDM array by embedding the conjunction parameter into an embedded encoding using an artificial neural-network;

training a transformer-based machine-learning model by using, as training input, the generated CDM array masked by said mask and using, as training output, the generated CDM array, wherein each said CDM record is a token for transformer-based machine-learning model, wherein the conjunction parameter is a spatial conjunction parameter which comprises a position uncertainty at the TCA.

15. A non-transitory computer-readable medium comprising computer program instructions that, when executed by a computer, cause the computer to carry out the steps of:

receiving a dataset comprising a conjunction time series for each conjunction, wherein each said series is irregularly spaced and comprises a plurality of CDM records, each CDM record comprising a time to TCA, Time of Closest Approach, and a conjunction parameter;

generating a CDM array comprising a plurality of cells, one cell for each CDM record, organized in rows, one row for each conjunction time series, and a plurality of columns, where each row is right-aligned such that a rightmost column of the CDM array comprises the most recent CDM record for each conjunction time series;

generating a mask for the generated CDM array where each CDM record is masked if the time to TCA of said each CDM record is lower than a predetermined time to TCA threshold;

encoding each CDM record of the CDM array by embedding the conjunction parameter into an embedded encoding using an artificial neural-network;

training a transformer-based machine-learning model by using, as training input, the generated CDM array masked by said mask and using, as training output, the generated CDM array, wherein each said CDM record is a token for transformer-based machine-learning model, wherein the conjunction parameter is a spatial conjunction parameter which comprises a position uncertainty at the TCA.

16. The device according to claim 14, wherein the non-transitory computer-readable medium has stored thereon further instructions that, when executed by the device, cause the device to predict a conjunction parameter from CDMs using the trained transformer-based machine-learning model by:

feeding as input to the trained transformer-based machine-learning model a conjunction time series for each of the one or more conjunctions to be predicted, wherein each said series comprises a plurality of received CDM records, each received CDM record comprising a time to TCA, Time to Closest Approach, and a conjunction parameter, and a plurality of prediction CDM records to be predicted, each prediction CDM record comprising a periodic time stamp with a predetermined period and a masked conjunction parameter;

outputting predicted CDM records from the output of trained transformer-based machine-learning model, wherein the conjunction parameter is a spatial conjunction parameter which comprises a position uncertainty at the time of closest approach.

17. The non-transitory computer-readable medium according to claim 15, further comprising computer program instructions that, when executed by a computer, cause the computer to predict a conjunction parameter from CDMs using the trained transformer-based machine-learning model by:

feeding as input to the trained transformer-based machine-learning model a conjunction time series for each of the one or more conjunctions to be predicted, wherein each said series comprises a plurality of received CDM records, each received CDM record comprising a time to TCA, Time to Closest Approach, and a conjunction parameter, and a plurality of prediction CDM records to be predicted, each prediction CDM record comprising a periodic time stamp with a predetermined period and a masked conjunction parameter;

outputting predicted CDM records from the output of trained transformer-based machine-learning model, wherein the conjunction parameter is a spatial conjunction parameter which comprises a position uncertainty at the time of closest approach.

* * * * *